July 23, 1929.  J. BAILEY  1,721,983
FINISHING GLASS ARTICLES
Filed Jan. 21, 1921   6 Sheets-Sheet 1

James Bailey
INVENTOR

BY
ATTORNEY

July 23, 1929.  J. BAILEY  1,721,983
FINISHING GLASS ARTICLES
Filed Jan. 21, 1921   6 Sheets-Sheet 3

James Bailey
INVENTOR

BY
ATTORNEY

July 23, 1929. J. BAILEY 1,721,983
FINISHING GLASS ARTICLES
Filed Jan. 21, 1921   6 Sheets-Sheet 4

James Bailey
INVENTOR

BY
ATTORNEY

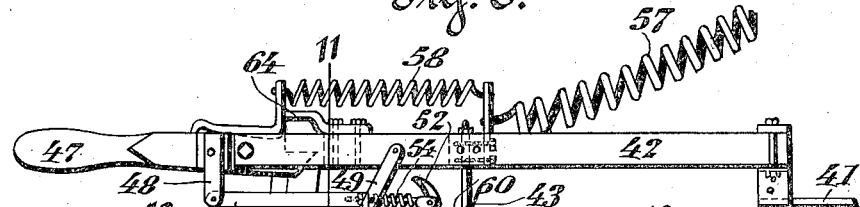
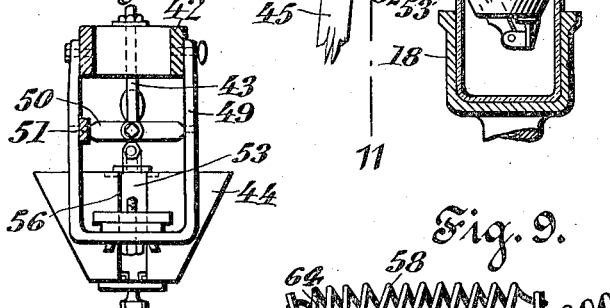
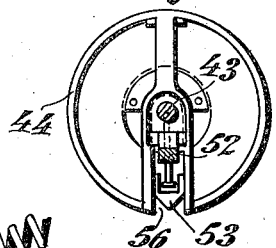
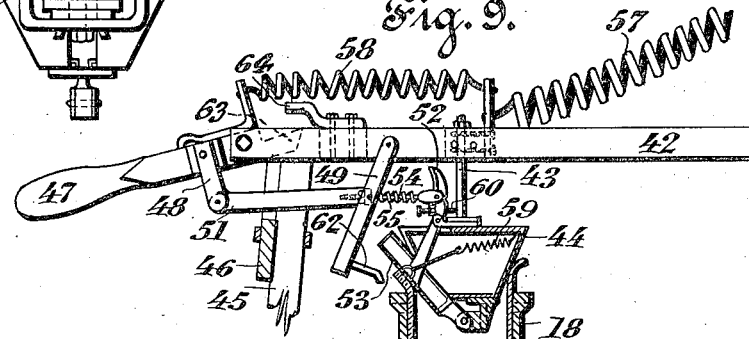
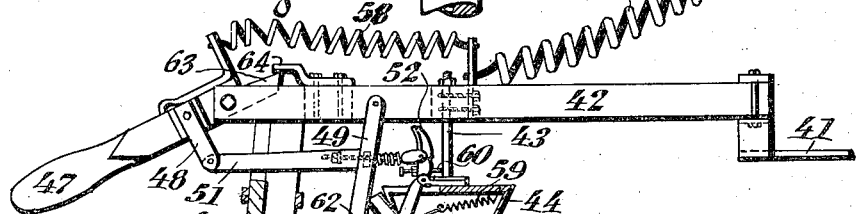
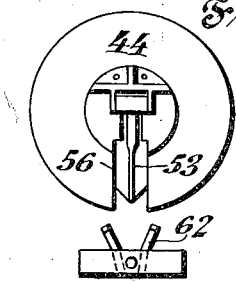
James Bailey
INVENTOR

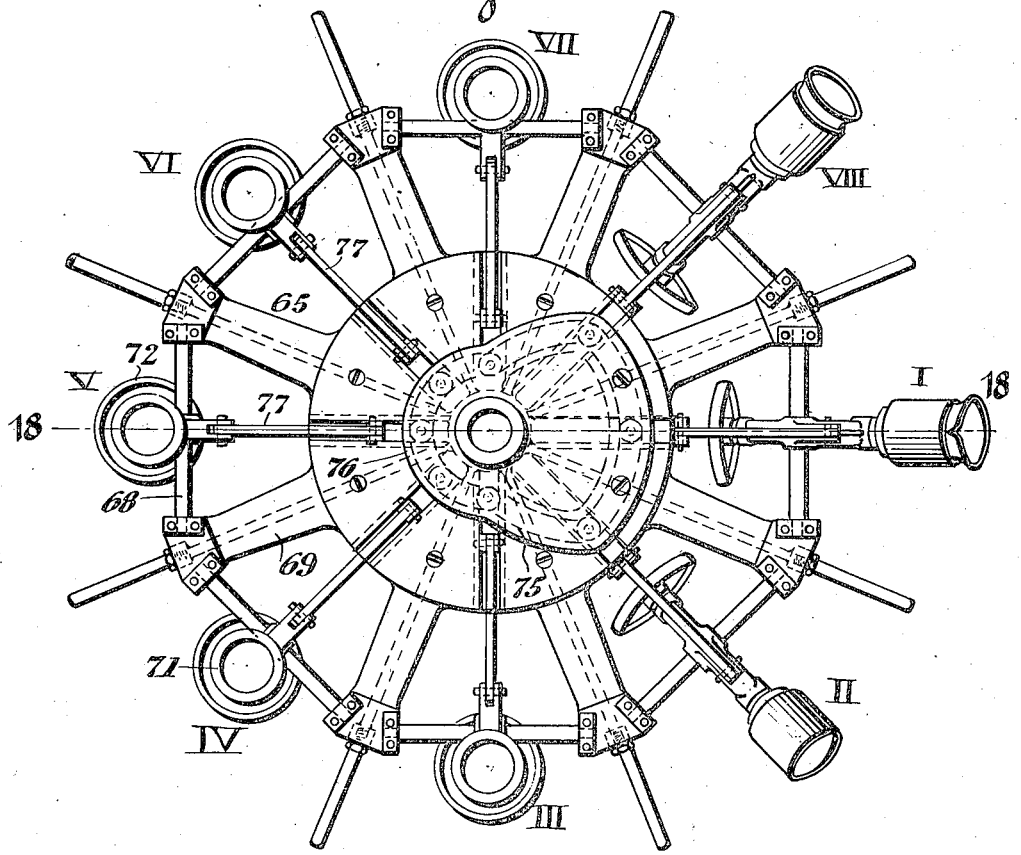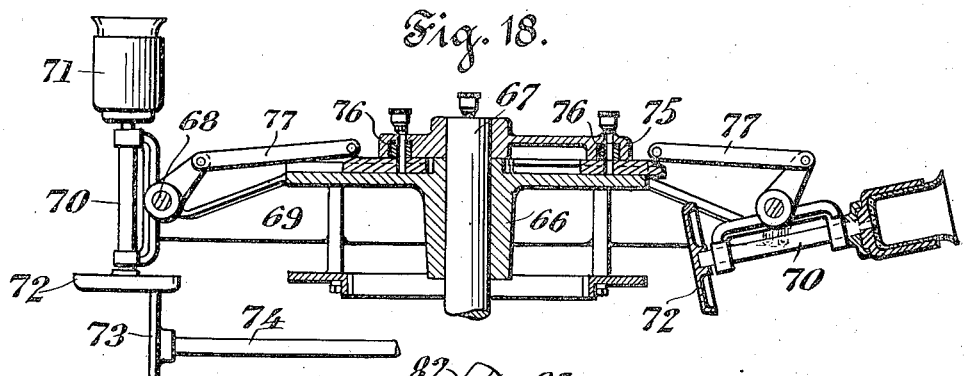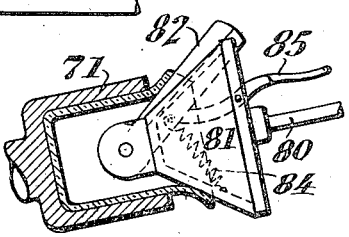

Patented July 23, 1929.

1,721,983

UNITED STATES PATENT OFFICE.

JAMES BAILEY, OF CORNING, NEW YORK, ASSIGNOR TO CORNING GLASS WORKS, OF CORNING, NEW YORK, A CORPORATION OF NEW YORK.

FINISHING GLASS ARTICLES.

Application filed January 21, 1921. Serial No. 438,981.

This invention relates to the manufacture of glassware, and in particular to a novel method and apparatus for finishing glass articles, particularly such as are blown.

It is the object of my invention to provide means for finishing the rough edges of thin-walled glass articles which results when the blow-over is removed from such articles.

By my method, the article, to be finished, is inserted into a container having a cavity whose top is formed similarly to the shape it is desired to impart to the top of the article, with the upper edge of the article projecting above the upper edge of the container. The container with the article therein is then brought into contact with a gas flame, so that the projecting upper edge of the article will be fire-polished and heated. The article is kept in contact with the gas flame until the glass at the top has softened sufficiently, and during this operation the container and article are revolved at sufficient speed to cause the softened glass to be forced outwardly, and thereby be caused to assume the contour of the top of the container.

In order that other persons skilled in the art to which my invention appertains, may practice my method and construct my apparatus, I will now describe in detail the salient features of my improvement.

In the following detailed description, which is illustrated by the accompanying drawings, and pointed out in the appended claims, I will, first, describe the method I use to provide an outwardly flared upper edge to glass blanks having straight walls; second, I will describe an automatic machine designed to fire-polish and re-shape the blanks in accordance with my method; and third, I will describe another machine that is designed to finish blanks having their upper edges flared outwardly during the blowing operation.

In the drawings:—

Figure 5:
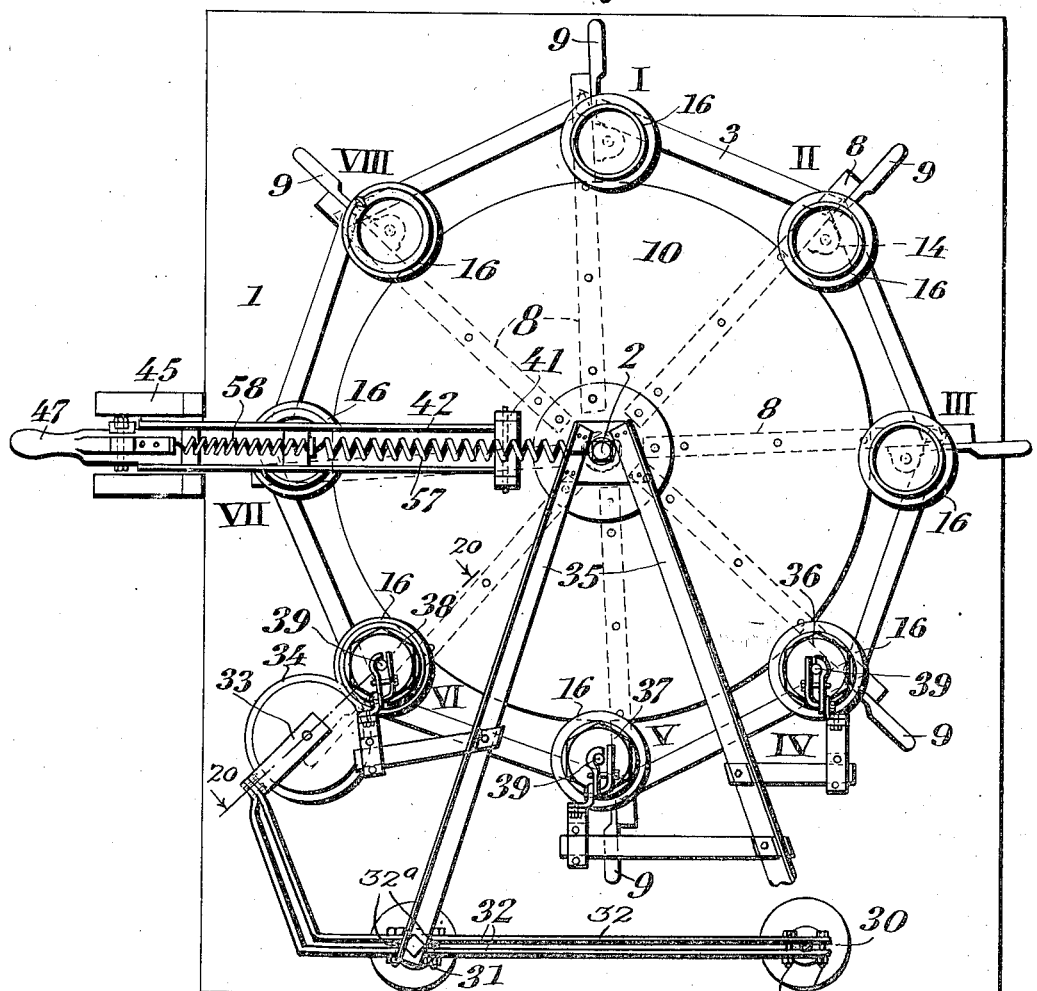
Fig. 5, is a plan view of a machine designed to automatically finish thin glass articles having vertical side walls.
Figure 6:
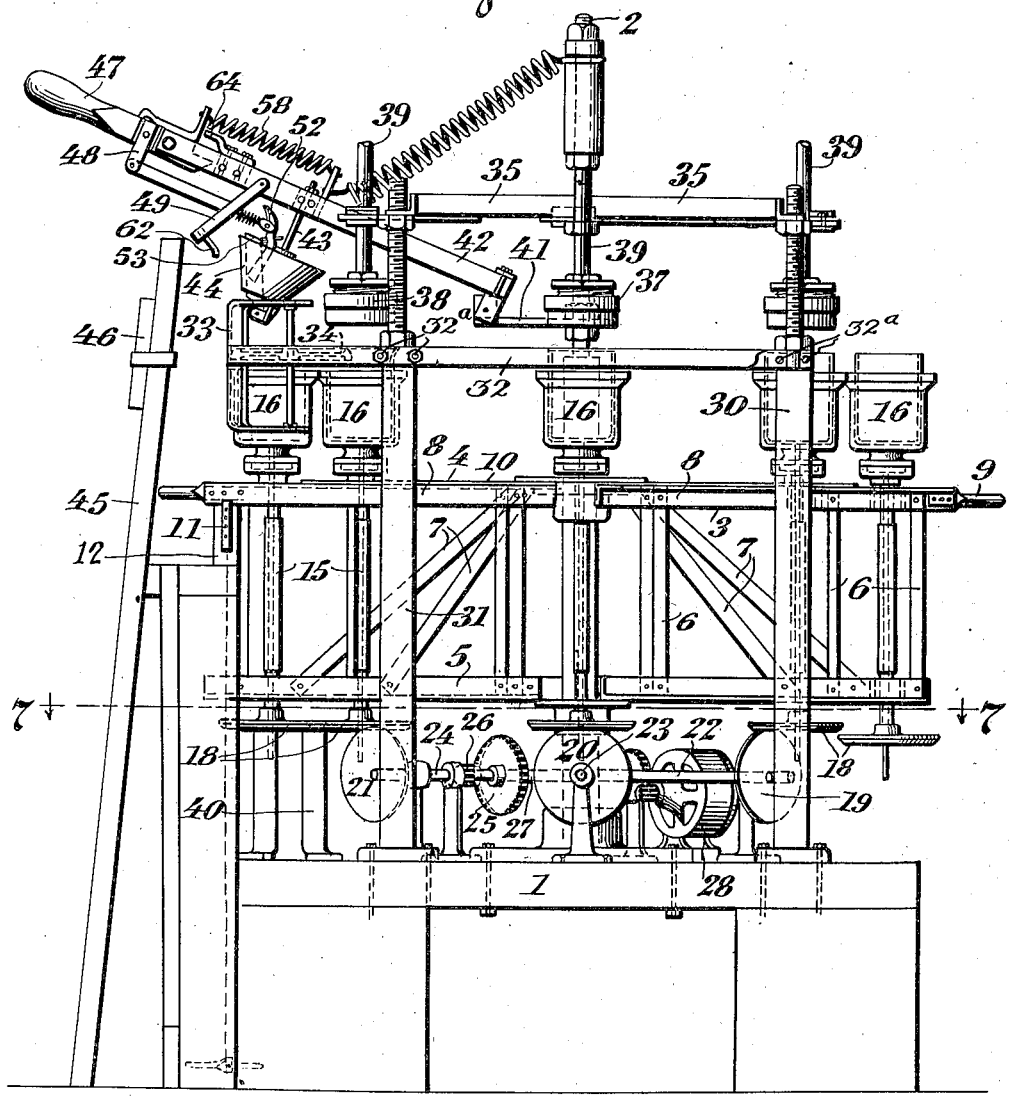
Fig. 6, is a side elevation of the machine shown in Fig. 5.
Figures 6A, 6B:
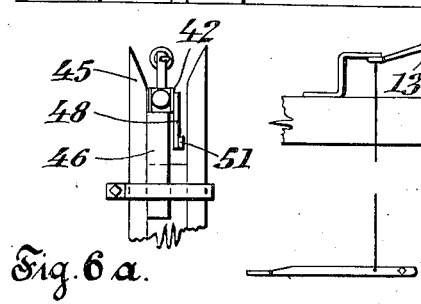
Figure 7:
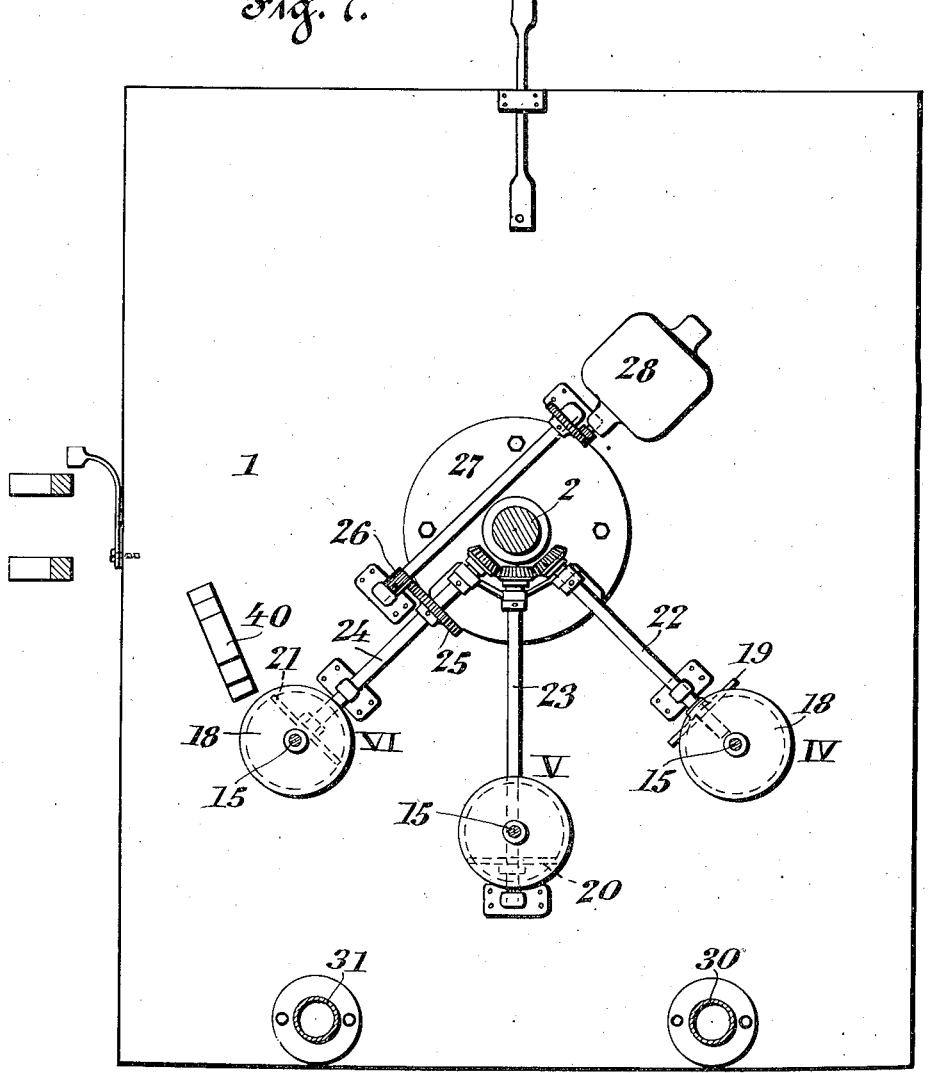
Figure 20:
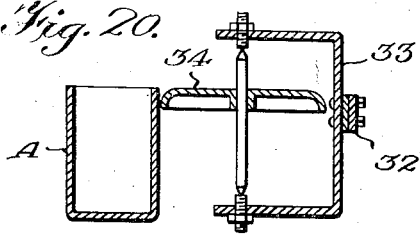

Fig. 6$^a$, is a front view of the stop for the lipping arm;

Fig. 6$^b$, is a similar view of the frame indexing latch;

Fig. 7, is a horizontal section taken approximately on the line 7—7 of Fig. 6, showing a plan view of the driving mechanism for the machine;

Fig. 8, is a vertical section taken approximately on the line 8—8 of Fig. 5, showing in side elevation, a portion of the article shaping means;

Figs. 9 and 10, are views of the article shaping means shown by Fig. 8, illustrating progressive steps in the shaping operation;

Fig. 11, is a vertical cross section taken approximately on the line 11—11 of Fig. 8;

Fig. 12, is a horizontal section taken approximately on the line 12—12 of Fig. 8;

Fig. 13, is a detailed bottom plan view of the shaper shown in Fig. 8;

Figs. 14, 15, and 16, are detailed plan views of the glass article during the fire-polishing shaping steps accomplished by means of the machine shown by Figs. 5 to 13 inclusive;

Fig. 17, is a plan view of a machine for finishing glass articles having vertical side walls that have their upper edges cracked-off at a blow-over;

Fig. 18, is a vertical section taken approximately on the line 18—18 of Fig. 17;

Fig. 19, is a detailed view illustrating the manner of completing the shaping operation by means of the machine shown by Fig. 17; and Fig. 20 is a section along the line 20—20 in Fig. 5 showing the contour and mounting of the flaring wheel 34.

Referring now to the drawings, and especially to Figures 1 to 4 inclusive, the glass article A, which may be of any desired size and shape, is, in the present instance, shown in the form of a cylindrical blank having a closed bottom $A^1$, an open top $A^2$, and whose side walls $A^3$ are substantially cylindrical.

As an illustration of the purpose of my invention, I will explain that the article illustrated, is known as a beaker, such as is used by chemists in laboratory work. It is desirable that beakers be provided with an outwardly flared upper edge having a pouring spout or lip formed therein. It has usually been the practice to form the spout in the upper edge of the beakers during the fire-polishing operation, while the glass is soft, which latter is done after the surplus glass left on the top of the ware when it is removed from the blowing mold has been removed by cracking-off or grinding.

The article A after having its surplus glass cracked-off is inserted in a container B, that is of slightly less height than the height of the article A. The container B is mounted for rotary movement in the upper end of a vertical shaft $B^1$, driven by suitable means so that an even rotary motion will be imparted to the container and article. In the present instance, I have shown the use of a friction drive $B^2$ from an electric motor C, these parts being diagrammatically illustrated in Figures 1 and 3.

When the article A has been inserted in the container B, and the latter set in motion by means of the friction drive, means for heating and fire-polishing the article are then positioned over the open mouth of the article.

The heating and fire-polishing means consists of a disk-like shell D, formed from suitable refractory material, and provided with a flat circular cavity $D^1$, that communicates with the underside of the shell. The lower surface of the shell D has formed thereon a series of concentric corrugations $D^2$, whose purpose will presently be described. The tip of a burner $D^3$ is inserted in an opening $D^4$ formed in the shell D, on a tangent to the wall of the cavity $D^1$, and gasses which travel at high temperature from the burner will, in entering the cavity, be directed in the form of a swirling flame that passes downwardly through the opening thereof into the article A. The corrugations $D^2$ formed on the underside of the shell D, during the operation of the device, become very hot and radiate heat back against the upper edge of the article A. These corrugations also serve the purpose of maintaining an even pressure of the gas flame within the article by retarding the escape of the gases through the space between the shell and the upper edge of the article.

During the operation of the device, the article, after it has been brought into contact with the swirling flame from the burner, has its upper edge fire-polished and softened, then, as the glass farther down its sides become heated, the upper part of its wall will be turned outwardly, due to the centrifugal force of the revolving container, until it takes the form of the interior wall of the container, this latter member serving as means for limiting the outward movement of the softened material.

Figure 3:
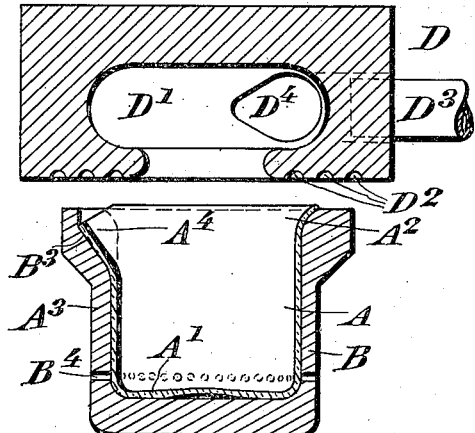
Fig. 3, is a view similar to Fig. 1. showing the article positioned in the apparatus after it has been finished.
Figure 2:
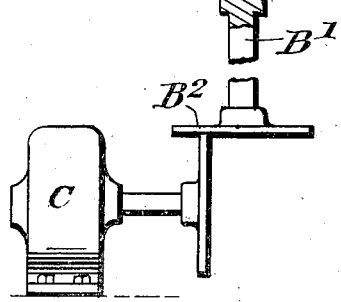
Fig. 2, is a bottom view of the burner used in connection with the apparatus shown by Fig. 1.
Figure 4:
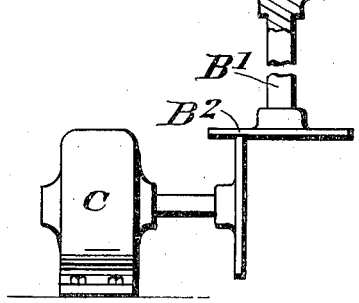
Fig. 4, is a plan view of the article and container shown in Fig. 3.

It is evident that any shape may be given to an article by my method. Thus, as illustrated by Figures 3 and 4, I have shown the inner wall of the container B, provided with a V-shaped notch $B^3$ that is formed in its inner upper edge. The purpose of this notch is to form a pouring spout or lip $A^4$, in the outwardly flared upper edge of the article A.

A series of perforations $B^4$, is shown in the lower portion of the container wall. The purpose of these perforations is to prevent the accumulation of hot gases in the bottom of the article and also the container, during the period the device is underneath the burner.

When the article has been finished, the container is moved from beneath the burner, and its motion stopped so that the glass can set and cool. Then the finished article is removed from the container, and placed in a leer for annealing.

Figure 1:
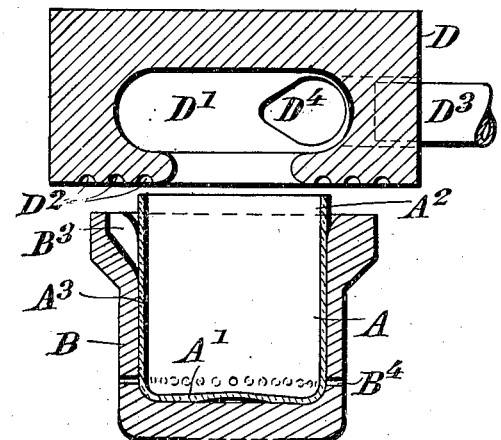
Figure 1, is a sectional view of an apparatus embodying the broadest aspects of my method for fire-polishing and shaping glass articles, an article having vertical side walls being shown in position therein, ready for finishing.

In actual practice it is desirable that my method be practiced successively upon many articles, therefore a plurality of containers similar to the one shown by Figures 1 and 3 can be mounted on a suitable frame that is designed to be stepped around a central axis, with several burners positioned over the containers in the path of movement of the latter for the purpose of finishing and fire-polishing the glassware.

An embodiment of such an apparatus is shown by Figures 5 to 13 inclusive of the drawings.

The apparatus consists of an assemblage of several instrumentalities adapted to operate in connection with each other in finishing glassware, such instrumentalities comprising means for supporting and rotating the glassware, means for fire-polishing and flaring the glassware; and means for lipping the glassware.

The several instrumentalities are suitably mounted whereby the operations can be performed by two attendants, one of whom loads and unloads the glassware, while the other intermittently steps the apparatus around its axis and operates the lipping mechanism.

The glassware that is to be finished, is placed into suitable containers carried by the periphery of a skeleton frame mounted for rotary movement about a standard. After a piece of glassware has been inserted into a container at the loading position, it is intermittently carried around, being brought successively to the fire-polishing, flaring and lipping positions.

The loading position is indicated by the numeral I, and the remaining positions are respectively numbered II, III, IV, V, VI, VII, and VIII. At positions II and III, the glassware is initially heated by the hot containers, for the latter are, during the time the apparatus is in operation, maintained at fairly high temperature. At position IV, the glassware is brought beneath a gas flame of medium velocity and is slowly rotated so that the flame is uniformly distributed to heat the glass. At position V, the glassware is rotated at slightly increased speed than that at position IV, while a gas flame of increased velocity softens the glass sufficiently to fire-polish it. At position VI, the glassware is rotated very rapidly beneath a gas flame of high velocity whereby the glass will be softened sufficiently to be flared, means being provided at this position for shaping the flare. Between positions VI and VII, is located a brake for arresting the rotatory motion of the glassware. When the glassware is brought to position VII, the lipping means is used while the glass is still hot and in a plastic condition. After the lipping operation the glassware is moved to position VIII, to permit it to cool and set. On the next movement of the frame, the finished glassware is brought to position I and removed from its container, and an unfinished piece inserted therein for finishing.

The apparatus is mounted on a base 1, having secured thereon a standard 2, that forms an axis about which rotates an octagonally shaped skeleton frame 3. The frame is composed of similarly formed upper and lower perimentral sections 4 and 5 respectively, that are connected by vertical and diagonal braces 6 and 7 respectively. The peripheral edges of the upper and lower sections are formed from even lengths of angle-iron, which are suitably fastened together adjacent the vertical braces 6. Radial braces 8 extend from the standard 2, to the vertical braces 6 of the skeleton frame. The projecting ends of the upper braces 8 have secured thereto handles 9, by means of which the table can be rotated about the standard.

A circular plate 10, that forms a cover for the skeleton frame, is secured to the braces 8, as shown in Fig. 5, and it is the purpose of this cover to prevent particles of glass and other foreign matter from falling upon the mechanism of the apparatus that is located beneath the skeleton frame.

A pedal controlled, spring pressed latch 11, is fixed to the side of a standard 12 extending from the base 1, at position VII. This latch is provided with a notch 13 that engages the lower edge of the radially extending braces 8. The construction of the latch is such, that it automatically indexes the frame, so that the glassware being carried thereby, is brought into accurate registration with the successive positions it assumes during the operation of the apparatus. When the pedal of the latch is depressed, its notch clears the brace 8, with which it is engaged, and the skeleton frame can then be moved around its axis. The latch will engage the next brace 8 and thereby prevent over running of the frame.

Carried by bearings 14, fixed to the braces 8, adjacent the vertical braces 6, are tubular spindles 15, that have secured to their upper ends, containers 16 for the glassware. These containers are formed with a cavity of approximately the same size and contour as the glassware, but their height is less than the height of the glassware, so that the upper edge of the latter can project above the top of the former, for a purpose to be later described.

Each of the containers are similarly formed, to provide a set, by means of which a large quantity of glassware can be finished during a run of the apparatus. The containers are detachably fastened to their spindles, for the purpose of permitting them to be removed, so that other forms of containers can be used in finishing other shapes of glassware.

In this manner, with one apparatus in use in a glass factory, many sizes and types of glassware can be finished.

Fixed to the lower ends of each of the container carrying spindles 15, are disks 18, that are adapted to frictionally engage with disks 19, 20, and 21, on the outer ends of horizontal shafts 22, 23, and 24. The inner ends of the horizontal shafts terminate near the standard 2 (the shafts radiating therefrom at an angle of 45 degrees with each other) and they are connected by beveled gearing so they will be simultaneously driven.

The disposition of the shafts 22, 23 and 24, is such, that disks 19, 20, and 21, are located at positions IV, V, and VI, for the purpose of rotating the containers when they are at these positions.

A gear 25 keyed on the shaft 24, meshes with a gear 26, on the outer end of a shaft 27, that is mounted on the base 1, parallel to, but spaced from the shaft 24. The shaft 27, at its inner end is connected by gearing to a motor 28.

The construction of the driving mechanism is such that power from the motor will be transmitted to the disks 19, 20, and 21 by means of the inter-guard shafts 22, 23, and 24. The shaft 23, due to the form of gearing used, is rotated in a reverse direction to shafts 22 and 24, therefore, the disk 20 is located on one side of the center line of travel assumed by the disks 18 when the skeleton frame is being rotated around its axis, while the disks 19, and 21, on shafts 22, and 24, are located on the other side of such center line, so that the containers can be rotated at all of the positions in the same direction.

The disks 19, 20, and 21 are slidably mounted on the shafts 22, 23, and 24, so that they can be adjusted with respect to the disks 18, that the containers may, at positions IV, V and VI, be revolved at the desired speed. By referring to Fig. 7, wherein a plan view of the driving mechanism is illustrated, it will be noticed that the relative position of the disk 19 to disk 18 at position IV, is such that the spindles are rotated at approximately the same number of revolutions per minute as the shaft 22; while the relative position of the disk 20 to disk 18 at position V, is such that the container spindles are, at this position, rotated faster than the shaft 23; and the relative position of disk 21 to disk 18 at position VI, is such, that the spindles are, at this latter position, driven considerably faster than at the previous positions.

The disks 18 while being keyed to the lower ends of the container spindles, are slidably mounted thereon. Their normal position, when they are disengaged from the driving disks, is below the plane of the upper edges of these disks. When the frame of the apparatus is being intermittently rotated, these disks gradually ride up the edges of the driving disks, and in so doing, are set in motion. However, there is no sudden jar or shock to the mechanism of the apparatus, for a certain amount of slippage occurs at engagement of the disks. While the container at position IV is being stepped to position V, it continues to rotate, and likewise, the container being moved from position V to position VI continues to rotate.

A pair of standards 30 and 31, that are disposed to each side the center line of shaft 23 at position V, are fastened to the base 1, near its outer edge. These standards extend above the top of the skeleton frame a considerable distance, and have their uper extremities threaded. A pair of horizontal straps 32, are attached to the standards, and each has its own end extended beyond the standard 31, and bent inwardly towards the skeleton frame.

Fastened to the inwardly extending ends of the straps 32, is a forked bracket 33, that carries a flare shaping wheel 34. The wheel 34 is mounted so that its relative position to the container at VI, can be adjusted for different sizes of glassware, by slipping the straps 32 up or down on the standards 30 and 31, or from right to left as may be desired. When the proper adjustment has been made to fit the glassware the bolts 32ª are to be tightened to hold the adjustment. The periphery of the wheel is shaped to conform to the contour of the flare to be given the glassware, and its edge extends over the upper portion of the container to contact with the vertical wall of the revolving glassware in the container. The axle of the wheel is formed with conical point bearings, so as to reduce the friction to a minimum, and thus permit the wheel to be rotated by the revolving glassware without causing surface marks on the glass.

The standard 2 extends above the skeleton frame and its upper portion is threaded. Arms 35 that are connected to the threaded portions of the standard 2 and standards 30 and 31, from a supporting frame for a plurality of burners 36, 37, and 38, (such for instance as those shown in Figs. 1 to 3), that are respectively over the containers at positions IV, V, and VI. The burners are designed to project a flame downwardly to heat the upper edge of the glassware in the containers. They are suitably mounted in their supporting frame so that their relative positions can be adjusted to suit the conditions. The feed pipes 39 of the burners are provided at some convenient point, with valves (not shown) by means of which the flame emitted by each burner can be independently regulated.

After the glassware is loaded at position I. it absorbs heat from the container in which it is placed, until such container has been stepped to position IV. At this position, the portion of the glassware that projects above the container, is subjected to the heat from burner 36, the container being rotated, as previously described, to evenly distribute such heat to the glass.

The length of time the glassware remains under the burner at position IV, is controlled by the operator at position VII, who moves it to position V, when the glass has been heated the desired amount. The heat from burner 37 at position V, is such that, the glass is fire-polished. The glassware is rotated faster at this position, and this causes the glass, as it softens, to fall outwardly.

At position VI, the glassware is rotated faster beneath a flame of considerable velocity from burner 38. This flame softens the glass and assists the centrifugal force to throw the glass outwardly against the wheel 34, which acts as a support, and in so doing imparts the desired shape to the flare.

Between positions VI, and VII, the rotation of the glassware in the container is stopped by the disk 18, on the lower end of the container spindle, riding over a friction brake 40, that is fastened to the base 1, in the line of travel of the disks when the frame is being stepped around its axis.

Fastened to the pedestal 2, below the burner supporting frame, is a bracket 41, that extends towards position VII, and has hinged thereto an arm 42, which carries the mechanism for forming the lip in the flared portions of the glassware. This arm is formed from two parallel strips that are spaced apart, and suitably secured together by means of bolts, spacing blocks being interposed between the strips at intervals through their length. The arm extends beyond the outer edge of the skeleton frame of the apparatus, and its normal position, is at an angle to the top of the frame, so that the lipping mechanism will be above the containers as they are stepped from one position to the next. The arm is held raised by a relatively long spring 57 that is connected to the top of the standard 2. The tension of this spring is sufficient to raise the arm and the various devices carried thereby to clear the top of the glassware. This spring also serves the purpose of a counter weight when the lipping device is in operation.

A rod 43, that is passed downwardly through one of the spacing blocks intermediate the length of the arm 42, has rigidly fastened thereto, a shell 44, in the form of a frustrum of a cone.

The shell 44 is mounted with its base uppermost, and its tapered, outer wall, pointed downwardly, so that it will enter the flared open mouth of the glassware, without touching the glass, when the arm 42 is swung down.

The purpose of the shell is to support the glass during the formation of the lip. It has mounted therein a lipper consisting of a V-shaped arm 53, that is designed to press the glass outwardly for a restricted zone in the circumference of the flared portion of the glassware. The arm 53 is pivotally connected to the bottom of the shell 44. A slot 56 is formed in the wall of the shell, and the arm 53 is mounted for movement through this slot. When the lipping mechanism of the apparatus is inoperative, the arm 53 is retained within the shell by means of a contractile spring 59, that is fastened to the upper end of the arm and to the opposite side of the shell.

Pivoted to the outer end of the arm 42, between the strip thereof, is a handle 47, having rigidly depending therefrom a short arm 48. The pivoted end of the handle has fastened thereto an L-shaped bracket to which is attached one end of a spring 58. The opposite end of the spring is secured to a stud extending upwardly from the arm 42 near its center. The purpose of the spring 58 is to retain the handle in alignment with arm 42.

A U-shaped yoke 49, pivoted to the arm 42, between the shell 44 and the handle 47, has a cross-piece 50 swivelled in its sides intermediate the length thereof. This cross piece is connected to the arm 48 of the handle 47 by a link 51, and to a bell-crank lever 52 mounted in the shell 44 by means of a rod 54. The rod 54 has one end pivoted to the bell-crank lever 52, and its opposite end, which is threaded, passed through an opening formed in the cross-piece 50 of the yoke 49. A nut on the threaded end of the rod serves as means for limiting the outward movement of the yoke, while an expansible spring 55 that encircles the rod between the cross-piece 50, and the bell-crank lever 52, serves as a cushion. In this manner, all of the movable parts of the lipping mechanism are provided with resilient means, which will, during the operation of the device, absorb all shocks. The springs are also designed to return the parts to their inoperative position.

A pair of standards 45, that are spaced apart a distance slightly greater than the width of the arm 42, have secured thereto, a U-shaped cross-piece 46. The upper ends of the standards form a guide way in which the arm descends during the lipping operation, while the U-shaped cross-piece 46, acts as a stop against which the strips of the arm rest. Its purpose is to limit the downward movement of the arm, and thus prevent the outside of the shell 44 from contacting with the upper portion of the glassware sufficiently to injure the glass.

The inoperative position of the lipping mechanism is shown in Figure 6. In Figure 8, the device is shown with the arm brought downward and resting on the cross-piece 46 of the standards 45. The shell is in position within the glassware, and the handle 47 is in alignment with the arm 42.

When further downward pressure is exerted on the handle 47, this member buckles on its pivot, causing the yoke 49 to swing inwardly. This movement actuates the bell-crank lever 52, and its lower arm which is in engagement with the arm 53 in the shell 44, is moved outwardly and in doing so, forces the V-shaped arm outwardly through the slot in the shell. When the arm 53 is moved outwardly, it carries with it, the softened glass, (see Figure 9).

The extent of the outward movement of the arm and glass is positively fixed by a stop 60. This stop consists of a set-screw that is mounted in the upper end of the bell-crank lever in alignment with the supporting rod 43 of the shell. When this stop strikes the supporting rod of the shell, the arm 53, and bell-crank lever remain stationary, while the handle 47, and yoke 49 continue in motion against the tension of spring 55 encircling rod 54.

Fingers 62, carried by the lower end of the yoke 49, are brought into contact with the glass on each side of the V-shaped arm 53, and force the glass backward to give the lip the form shown by Fig. 16.

The inward movement of the fingers is sufficient to press the glass back in line with the periphery of the flare, and their movement is stopped when a nose 63 on the front end of the handle engages with a Z-shaped stop 64 on the arm 42.

Upon releasing the pressure upon the handle 47, the several springs, which have been put under tension, will return all of the parts to inoperative position, and spring 58 pulls the arm 42 upwardly out of the way so that the glassware can be moved to position VIII to cool and set while the glassware that is being flared at position VI is brought to position VII for lipping. In the operation of the apparatus the several functions are timed so that the lipper is in use intermittently several times a minute, and the glassware is loaded and unloaded about as fast as can be done by operator at position T In Figures 14, 15, and 16, I have illustrated in plan, views of the glassware as it appears at positions I, VI, and VIII of the apparatus just described. The specific form of glassware shown is known to the trade as beakers, such as used by chemists in laboratory work.

The glassware H, shown by Figure 14 consists of a cylindrical body having a closed bottom and parallel side walls. This is placed into the container of the apparatus at position I, and at the successive positions up to VI, its upper edge is heated, in the manner previously described. At this latter position the glass is softened to such extent that it tends to fall and in doing so it is flared outwardly, as shown by Figure 15. The lip $H^a$, shown in Figure 16, is formed in the flared portion by the mechanism carried by arm 42 at position VII, the V-shaped arm 53 of such mechanism, forming the notch $H^b$, while the fingers 62 of the yoke 49 press the glass backwardly on each side of the notch $H^b$, as indicated by $H^c$.

In Figures 17, and 18, I have shown a form of apparatus in which the containers are pivotally mounted in a frame so that they are vertical at positions III to VII inclusive, and are substantially horizontal at positions VIII, I, and II; position I, being the lipping position while position II is the loading and unloading position.

This apparatus includes an octagonally shaped skeleton frame 65, that has its hub 66 mounted for rotation around a pedestal 67. Rods 68 that are journalled in bearings fastened to radially extending arms 69 of the frame 65, carry shafts 70 having on one of their ends containers 71 and on their opposite ends disks 72. The disks 72 are driven at positions IV to VII inclusive, (while the containers are in a vertical position) by disks 73 on the outer ends of radially extending horizontal shafts 74 that receive power from a motor in a manner similar to shafts 22, 23 and 24 of the apparatus previously described.

Burners are placed over the containers at positions IV to VII inclusive for the purpose of heating the upper edge of the glassware to fire-polish it, while at position VIII, there is a burner that projects a needle-like flame to heat the rim of the glassware in a restricted zone, so that the glass will be softened sufficiently to permit a lip to be formed therein at position I.

A cam track 75 is fixed to the top of the pedestal 67. Rollers 76 on the inner ends of links 77 that are connected to the container pivots. are mounted in the cam track 75. The design of the track is such that it is composed of two concentric runs, one of which is or short radius, while the other is of long radius. When the rollers 76 are in that portion of the track that is of short radius, the containers will be vertical, and when the rollers are in the portion of the track that is of long radius the containers will lie in an approximate horizontal position.

The cam track is positioned on the apparatus so that the containers will be vertical at positions III to VII inclusive, and horizontal at positions VIII, I and II. The transposition of the containers, between positions VII and VIII, and II and III, is accomplished while the frame is being intermittently stepped around the pedestal.

As it is not necessary to lip some forms of glassware that can be fire-polished by this apparatus, the lipper is not mounted on the standard, but is applied by the operator at position I. This lipper is in the form of a tool, having a handle 80 to which is secured a conically shaped shell 81 having pivoted therein a lipping arm 82. The arm 82 is retained within the shell by means of a spring 84. A lever 85 that is pivoted in the shell, has one end bearing against the arm 82 and its other end formed into a handle that lies near the handle 80.

In this modification of my invention, when it is desired to form a lip in the glassware, a burner having a constricted flame, is directed towards the edge of the glass while it is held stationary, and a restricted zone thereof heated, then the lipping tool described above is inserted therein, and the lever 85 manipulated to force the arm 82 outwardly, as shown by Fig. 19. The parts are held in this position long enough to permit the glass to set, then pressure on the lever 85 is released, and the shell removed.

Having thus described my invention, what I claim is:—

1. The method of flaring and lipping glassware which consists in supporting the glassware with the portion thereof to be finished projecting above the support, then heating such portion and at the same time rotating the glassware whereby the heated glass will be given a flare, then stopping the rotation of the glassware and directing a flame on a restricted zone of its flared portion, and then forming the lip in such portion while the glass is still hot.

2. An apparatus of the class described comprising a frame mounted for movement around a vertical axis, a plurality of containers for the glassware revolubly mounted in the periphery of the frame, a plurality of heating members mounted over the containers, the number of heating members being less than the number of containers, each successive heating member being designed to impart an increased amount of heat to the glass, and means for rotating the glassware when it is under the heating members, said rotating means being designed to rotate the glassware at an increasing speed in proportion to the increased amount of heat from the heating members.

3. An apparatus of the class described comprising a frame mounted for movement around a vertical axis, a plurality of containers for the glassware revolubly mounted in the periphery of the frame, a plurality of heating members mounted over the containers, the number of heating members being less than the number of containers, each successive heating member being designed to impart an increased amount of heat to the glass whereby the glass will be gradually heated until it is soft, means for rotating the glassware when it is under the heating members, said rotating means being designed to rotate the glassware an increased amount in proportion to the increased amount of heat from the heating members whereby the soft glass will be forced outwardly in the form of a flare, and means for limiting the amount of flare in the glass.

4. An apparatus of the class described comprising a frame mounted for movement around a vertical axis, a plurality of containers for the glassware revolubly mounted in the periphery of the frame, a plurality of heating members mounted over the containers, the number of heating members being less than the number of containers, each successive heating member being designed to impart an increased amount of heat to the glass whereby the glass will be gradually heated until it is soft, means for rotating the glassware when it is under the heating members, said rotating means being designed to rotate the glassware at an increasing speed in proportion to the increased amount of heat from the heating members whereby the soft glass will be forced outwardly in the form of a flare, means for limiting the amount of the flare in the glass, and means for forming a lip in the flare while the glass is soft.

5. An apparatus for finishing glassware comprising a rotary mounted frame having means for holding the glassware, said frame being designed to be stepped around whereby the glassware will be intermittently brought to successive positions, means at certain of the positions for heating the portion of the glassware that is to be finished, said heating means being arranged whereby the amount of heat transmitted to the glassware will be increased at the successive positions assumed by the glassware, and means for rotating the glassware while it is being heated, said rotating means being designed to rotate the glassware at an increased speed in proportion to the amount of heat.

6. In a glass-finishing machine, the combination of a holding device, and a fire-polishing burner having corrugations on the face thereof adjacent to the holding device.

7. In a fire-polishing machine, the combination of a ware-retaining means and a fire-polishing burner having corrugations on that face which is adjacent to the article to be finished to retard escape of products of combustion below such face.

In testimony whereof, I hereunto sign my name at Corning, New York, this 18th day of January 1921.

JAMES BAILEY.